Patented Feb. 7, 1950

2,496,803

UNITED STATES PATENT OFFICE 2,496,803

PRODUCTION OF VERATRALDEHYDE FROM VANILLIN

Donald McMillan, Euclid, Ohio, assignor to E. I. du Pont de Nemours & Company, Wilmington, Del., a corporation of Delaware No Drawing. Application January 15, 1947, Serial No. 722,294

1 Claim. (Cl. 260—600)

This invention relates to the manufacture of veratraldehyde and is more particularly directed to processes in which veratraldehyde is produced by the addition to vanillin of caustic and dimethyl sulfate at a pH from about 8.5 to 9.5.

Veratraldehyde has heretofore been produced by processes in which vanillin is treated with dimethyl sulfate and caustic has been used to reduce the acidity of the reaction, but in such prior art processes relatively poor yields are obtained, say 80%, and the products produced are of relatively poor quality.

It is an object of this invention to provide simple and economical processes by means of which veratraldehyde may be made from vanillin. It is a further object to provide processes for the production of veratraldehyde from vanillin in good yield and to obtain products of high quality. Further objects will become apparent hereinafter.

The foregoing and other objects of the invention are attained by simultaneously adding caustic and dimethyl sulfate to vanillin and by maintaining a pH within the range of 8.5 to 9.5.

The reaction may be represented as follows:

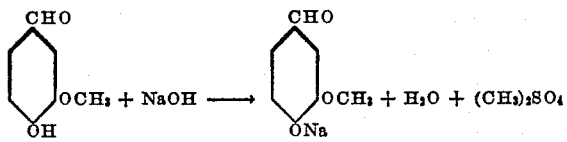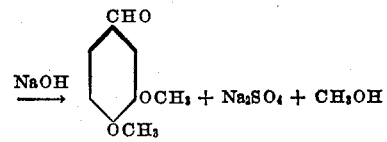

In conducting a process of the present invention, vanillin is added to water and melted by heating. Caustic is added to dissolve the vanillin and the pH is then adjusted.

The caustic is preferably sodium hydroxide but another caustic may be used which will neutralize the acidity and maintain the indicated pH range. There may, for instance, be used potassium hydroxide, calcium hydroxide, sodium carbonate, and the like.

To the vanillin, which is in the desired pH range, there is then added simultaneously caustic and dimethyl sulfate. Another methylating agent such as $NaCH_3SO_4$ may be used. The addition of caustic and dimethyl sulfate is made with each of the materials present in such amount as to maintain the pH within the desired range.

The methylation is continued to produce the desired methylation. Usually a small excess of dimethyl sulfate, say 25 per cent, will be used.

After the addition of caustic and dimethyl sulfate is complete the reaction is allowed to continue for a short time, say fifteen minutes or so, and then the system is acidified to pH 4.0 to 5.0. Sulfuric acid may be used or there may be used any other acid by means of which a pH of 4 to 5 can be obtained. There may be used, for instance, hydrochloric acid, sulfamic acid, and the like.

After acidification the system separates into an aqueous phase and a veratraldehyde phase and the aqueous phase may be drawn off from the bottom of the reactor to leave the veratraldehyde. The veratraldehyde may then be treated further or may be discharged to suitable containers.

It is to be observed that the temperatures used throughout should be maintained around 80 to 90° C. When the vanillin is first put in water the temperature must be raised up to about 80° C. and heat must be supplied. During the addition of caustic and dimethyl sulfate some cooling is required to keep the temperature between about 80 and 90° C. During acidification the temperature should be maintained by supplying heat as needed to hold the temperature to about 70 to 80° C.

As has been indicated above, it is generally desirable to maintain the pH between about 8.5 and 9.5 throughout the methylation. To this end the caustic is added to the vanillin to adjust the pH within the range indicated and then caustic is supplied simultaneously with dimethyl sulfate. It is still more specifically preferred to operate within a pH range from 9.0 to 9.5. Within this narrow range the best results of the invention are obtained.

While it is quite important to hold the pH within the ranges stated, particularly during the addition of dimethyl sulfate, it will be understood that in a commercial operation this pH control may be achieved by the stepwise addition of predetermined amounts of material. A laboratory, for instance, can determine under specific conditions of operation just what increments must be added and the plant may follow a predetermined schedule of additions. It is, however, ordinarily to be preferred to check the pH of the system to be sure that the pH at no time goes outside of the ranges above indicated.

In order that the invention may be better understood reference should be had to the following illustrative example:

Example

A water heel from a preceding operation was charged into a reaction kettle in the amount of 442 pounds. To the water was added 362 pounds of vanillin and heat was applied to melt the vanillin. The temperature reached was about 80 to 85° C.

Sodium hydroxide in the amount of 143 pounds of a 50% solution was then added and a small amount of cooling was supplied to hold the temperature within the range of 80 to 90° C. The amount of caustic was that required to adjust the pH to about 9.2.

A 50% solution of sodium hydroxide and dimethyl sulfate were then simultaneously added to the kettle over a period of about four hours. The pH was maintained within the range pH 9.0 to 9.5 during the reaction. The temperature was held by cooling within the range of 80 to 90° C. During the simultaneous reaction of caustic and dimethyl sulfate there was added 143 pounds of a 50% solution of sodium hydroxide and 376 pounds of dimethyl sulfate.

After the addition of caustic and dimethyl sulfate was complete the reaction was held for about 15 minutes and then the reaction mixture was acidified to a pH of 4.0 to 5.0 by the addition of 58 pounds of sulfuric acid (50% $H_2SO_4$). During the acidification temperature was maintained between about 70 and 80° C. using steam.

The reaction mass was allowed to settle for one hour and the aqueous phase was drawn off from the bottom of the kettle and discharged to waste except for the fraction returned to the first step of a similar reaction. The veratraldehyde was recovered as the product of the process.

I claim:

In a process for the production of veratraldehyde, the steps of melting vanillin in water by the application of heat, adjusting the vanillin to pH 9.0 to 9.5 with sodium hydroxide, then adding simultaneously thereto sodium hydroxide and dimethyl sulfate, the increments of sodium hydroxide and dimethyl sulfate added being such as to maintain a pH of about 9.0 to 9.5, upon completion of methylation acidifying the system to a pH of 4.0 to 5.0, and then separating veratraldehyde from the aqueous layer which forms.

DONALD McMILLAN.

REFERENCES CITED

The following references are of record in the file of this patent:

Buck: "Organic Synthesis," vol. XIII (1933), pages 102–104.

Barger et al.: Jour. Chem. Soc. (London), vol. 133, page 2924 (1928).